Aug. 5, 1930.　　　　J. T. WELCH　　　1,772,058
ARTIFICIAL MINNOW
Filed Jan. 26, 1929
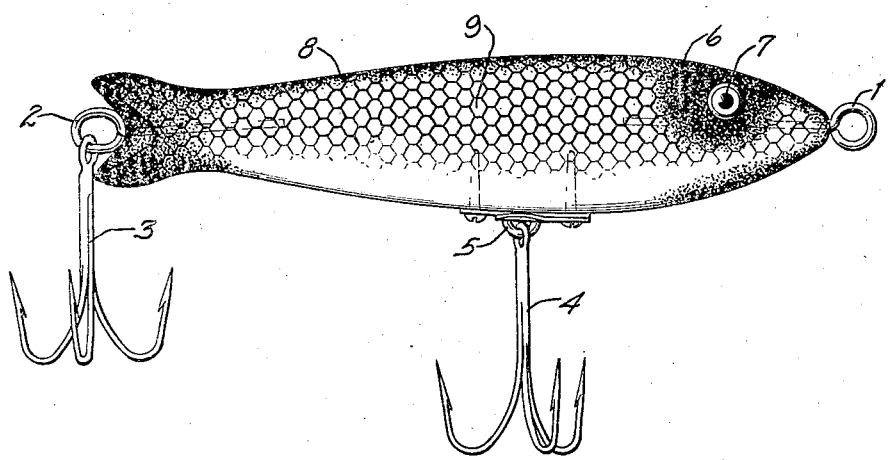
Inventor
Jack T. Welch,
By Manning & Manning
Attys.

Patented Aug. 5, 1930

1,772,058

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

ARTIFICIAL MINNOW

Application filed January 26, 1929. Serial No. 335,257. REISSUED

This invention which relates to an artificial minnow is concerned with certain improvements by which a more attractive and serviceable surface finish is produced at a considerable saving in labor and expense. While both of these advantages are realized in the present invention, either by itself marks an advance in the ancient art of fish lures.

The accompanying drawing shows in side elevation an artificial minnow having the improved features of this invention. The bait comprises a solid one-piece body which simulates the form, size and appearance of a minnow, and may be equipped with such accessories as eyes 1 and 2 at its front and rear ends respectively, the former for a line or leader, and the latter to support a gang hook 3 in the usual manner. A second gang hook 4 may also depend from an eye bar 5 which is secured to the bottom of the bait body, as shown. The eyes may be attached in place by screw threaded means of the usual kind.

The present bait differs from others in that it is formed of some material which is either partially or wholly transparent. Celluloid or pyralin are examples of two different products from which this bait may advantageously be made. A solid one-piece bait body formed of some such material excels in numerous respects. In the first place, the transparency and color (both of which are variable, may be selected with reference to the particular kind of minnow which is to be simulated in the finished bait. Whatever be the degree of transparency or shade of color chosen, it will permeate through the bait body and not be confined to the surface thereof. Accordingly the inherent transparency and color are not subject to marring or wearing off as in the case of a surface-decorated bait.

Not only will a solid bait so produced present the natural color of a minnow, but, as a second advantage, such additional decoration as may be required to complete the simulation is much less than ordinary, and is applicable with much less expense and effort. This comes about because of the necessity for a lesser amount of decoration due to the already natural finish resulting from the use of a transparent material for the bait body, and because the surface of a transparent bait body is such as to receive without further preparation the slight decorations that may be desired. By way of contrast with the procedure required in preparing for decoration the usual bait body when formed of wood, I eliminate altogether in the present invention the several dipping operations consisting of two coats of lacquer, three coats of enamel, and finally another coat of lacquer, all of which steps are preliminary to application of the scale finish and air brush work.

It will be noted that the bait illustrated in the accompanying drawing carries certain conventional markings—a heightened color zone 6 around the eyes 7 and below the mouth, a dorsal darkening 8, and scales 9 extending down upon the sides toward the belly. All such markings may be applied directly to the present bait body without preliminary treatment thereof. Furthermore, I would have it noted that a considerable portion of the bait body, mostly in the lower region, requires no decoration of any kind due to the inherent natural finish and appearance of the transparent material used. Such few decorative features as are suggested herein are ample for all purposes.

The surface decorations may vary all the way from opacity to transparency. This feature, taken in conjunction with the wide range in colors and transparencies available for the bait body, renders possible illimitable optical effects. For example, the scales 9 may be defined in outline only, but when viewed in the direction of the light they are colored or otherwise varied according to (1) the color and transparency of the bait body and (2) the surface decoration upon the opposite side of the bait body. This comes about through the fact that light penetrates the bait body to the extent that is permitted by the surface decorations thereupon, and in so doing it shines through the surface finish with such brilliancy as is permitted by the opacity of the several markings thereon. Such a bait when lying between a fish and the sun will present a most attractive optical effect due to the fact that the light penetrates the bait body to enhance the potency of the surface decorations, and this is in sharp contrast to all other baits of opaque character the visibility of whose markings are dependent upon light reflection rather than penetration.

A bait body of the kind under description may be produced economically by any one of several approved methods, casting in die moulds being perhaps the best. The material used beside being transparent or just translucent, and perhaps colored, is also impervious to water and so will withstand rough usage over a long period of service. In addition it is well adapted for the reception of such screw-threaded devices as are applied thereto for accessory purposes, and the threads formed therein will maintain a connection with the screw-threaded devices more secure and lasting than is possible to obtain with other materials now in use.

I claim:

1. A fish bait having a solid body of transparent material with surface decoration formed in part by the material of the body.

2. A fish bait having a solid body of transparent material with translucent surface markings producing an inherent variable coloring resembling that of a simulated minnow.

3. A fish bait having a solid body of transparent material with an inherent color resembling that of a simulated minnow, and surface decorations formed in part by the material of the body.

4. A fish bait consisting of a smooth solid fish-like body of transparent material to opposite side portions of the surface of which a decorative finish is directly applied.

5. A fish bait having a solid body of transparent material having a decorative surface finish through which solid body and decorative surface finish light may pass in varying degrees.

6. A fish bait consisting of a one piece solid body having a surface decorative finish, the body and finish both being of such material that light proceeding toward one side of the bait may pass in part therethrough to illuminate the opposite side thereof in varying degrees.

7. A fish bait having a solid transparent body having a decorative surface finish interrupted at places to simulate scales, whereby the light visibility through such interrupted places is different than in the adjacent places to produce a heightened optical effect.

In testimony whereof, I have hereunto set my hand this 22nd day of January, 1929.

J. T. WELCH.